Feb. 17, 1925.
P. SPARTZ
1,526,810
VEGETABLE CUTTER
Filed May 2, 1924
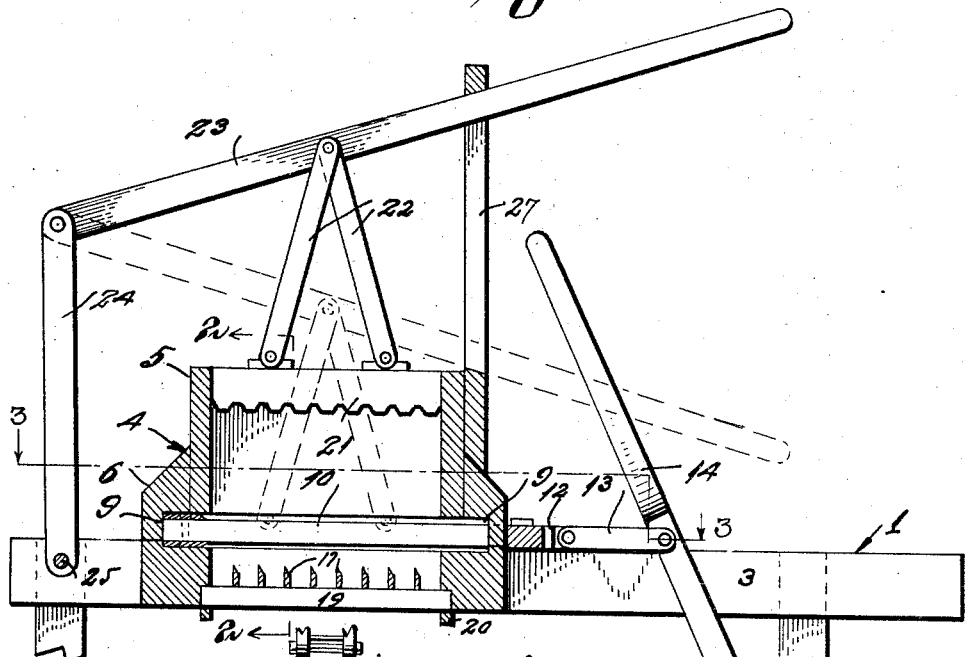
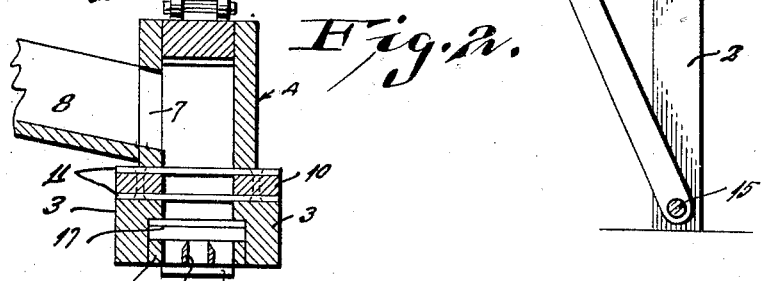
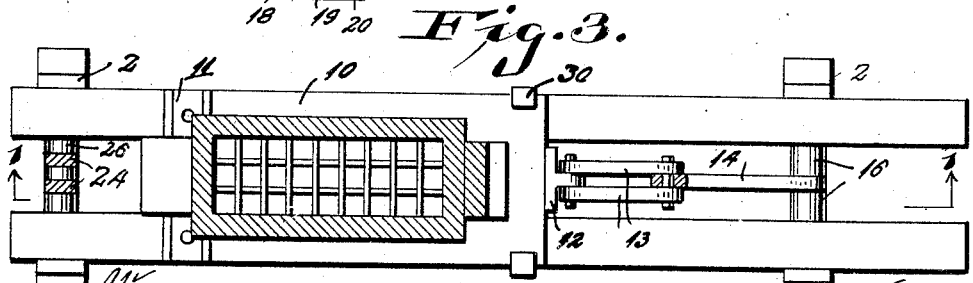
Inventor
Peter Spartz Patented Feb. 17, 1925.

1,526,810

UNITED STATES PATENT OFFICE.

PETER SPARTZ, OF SAUKVILLE, WISCONSIN.

VEGETABLE CUTTER.

Application filed May 2, 1924. Serial No. 710,538.

*To all whom it may concern:*

Be it known that I, PETER SPARTZ, a citizen of the United States, and resident of Saukville, in the county of Ozaukee and State of Wisconsin, have invented certain new and useful Improvements in Vegetable Cutters; and I do hereby declare that the following is a full, clear, and exact description thereof.

My invention relates to improvements in cutters and has for its object the provision of a machine adapted to slice vegetables or the like and then cut the slices into smaller parts.

The object of my invention is to provide a cutter of the class described in which the cutting elements may be removed and cleaned as occasion may demand, or cutting elements of various size may be substituted.

Another object of my invention is to provide a cutter having a plurality of cutting elements, one of which is adapted to be moved out of the path of the vegetables after it has performed its cutting stroke.

The invention further consists of certain novel features of construction and arrangement of parts which will be fully understood by reference to the accompanying drawings and to the claim hereinafter given.

In the accompanying drawings:—

Figure 1 is a vertical sectional view of my improved cutter, the same being taken on the line 1—1 of Figure 3.

Figure 2 is a sectional view taken on the line 2—2 of Figure 1, and

Figure 3 is a top plan view of the cutter taken on the line 3—3 of Figure 1.

Referring to the accompanying drawings, wherein like reference characters denote corresponding parts throughout the several views, the numeral 1 indicates a suitable frame formed of wood or the like and supported by legs 2. The frame 1 is composed of side bars 3 between which is positioned, and secured thereto in any suitable manner, a hopper 4 the upper portion of which is adapted to receive therein the vegetables to be cut, while its lower portion has positioned therein cutting elements of a character hereinafter described.

Upon referring to Figure 1, it will be noted that the hopper 4 is composed of a rectangular receptacle 5 the end walls of which are supported by blocks 6 positioned between the side bars 3, said blocks being of such a structure as to hold the bottom edges of the receptacle 5 in spaced relation with the top faces of the side bars 3. One side wall of the receptacle 5 is provided with an opening 7 through which the vegetables to be cut are fed to the cutters, the same being guided into the receptacle 5 by a suitable trough 8. The blocks 6 are further provided with opposed grooves 9 in which a cutting element, hereinafter described, is adapted to rest after having completed its cutting stroke.

The side bars 3 have slidable thereon a U-shaped member 10, the legs of which lie under the side walls of the receptacle 5 and are connected at their extremities by a pair of super-spaced cutters 11, each having a double cutting edge.

The member 10 has secured to its base portion an ear 12 to which is pivotally connected links 13 which are further pivotally connected to a lever 14, one end of which is mounted for pivotal movement upon a rod 15 which forms a brace between the lower end portions of a pair of supporting legs 2. The lever 14 is positioned midway of the rod 15 by spacing sleeves 16.

The under portions of the side bars 3 have fitted therein a plurality of transverse cutting elements 17 which are held within a cut out portion in the side bars by means of a removable strip 18. Positioned under the cutters 17 and arranged at right angles thereto is another set of cutting elements 19 which are likewise held in place by strips 20.

Movable within the receptacle 5 is a pressure exerting member 21 which is formed of any suitable material and having its under face provided with a number of corrugations, while its upper face has connected thereto links 22 which are connected to a lever 23 pivoted between a pair of links 24, the latter being mounted for movement upon a rod 25 arranged between the side bars 3. The links 24 are maintained in spaced relation upon the rod 25 by suitable spacing sleeves 26. The free end of the lever 23 passes through a suitable guide 27 secured to the receptacle 5 and extending vertically therefrom.

In the operation of my improved cutter, assuming that the parts are in position as illustrated in Figure 1, the operator places upon the trough 8 the vegetables to be cut and permits the same to feed through the opening 7 provided in one side of the receptacle 5. The first operation is to cause the backward movement of the lever 14, moving the cutting elements 11 from one end of the receptacle to the other, and if so desired this operation may continue indefinite as long as the article to be cut feeds itself thereto. After the vegetables have been cut sufficiently by the elements 11, the lever 14 is moved so as to position the cutters 11 within one of the grooves 9, thus removing the cutters from the downward path of the vegetable. The next operation is to cause the downward movement of the pressure exerting member 21 to force the sliced vegetables through the next set of cutters, and this is caused by a movement of the lever 23.

If so desired, both levers may be operated at approximately the same time by any suitable means, the purpose of which being to eliminate the loss of time.

In order to insure the proper movement of the member 10 upon the face of the side bars 3 I have arranged upon the latter a pair of guide members 30, the upper end portions of which overhang the face of the member 10.

From the foregoing, it is thought that the operation, construction and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

A device of the class described having a receptacle and a plurality of fixed cutters carried by its supporting member, a movable cutter adapted for movement between said receptacle and its supporting member, means for forcing the article to be cut through said receptacle, and said receptacle having recesses in any one of which said movable cutter is adapted to rest upon the completion of its cutting stroke out of the path of the forcing means.

In testimony that I claim the foregoing I have hereunto set my hand at Saukville, in the county of Ozaukee and State of Wisconsin.

PETER SPARTZ.